(No Model.)
J. H. B. REA & W. M. ROBINSON.
FERTILIZER DISTRIBUTER.
No. 249,093. Patented Nov. 1, 1881.
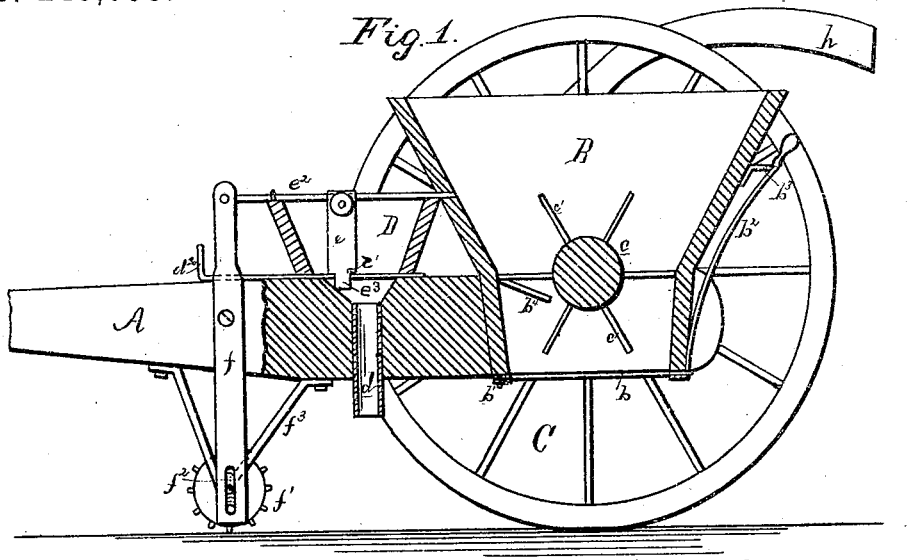
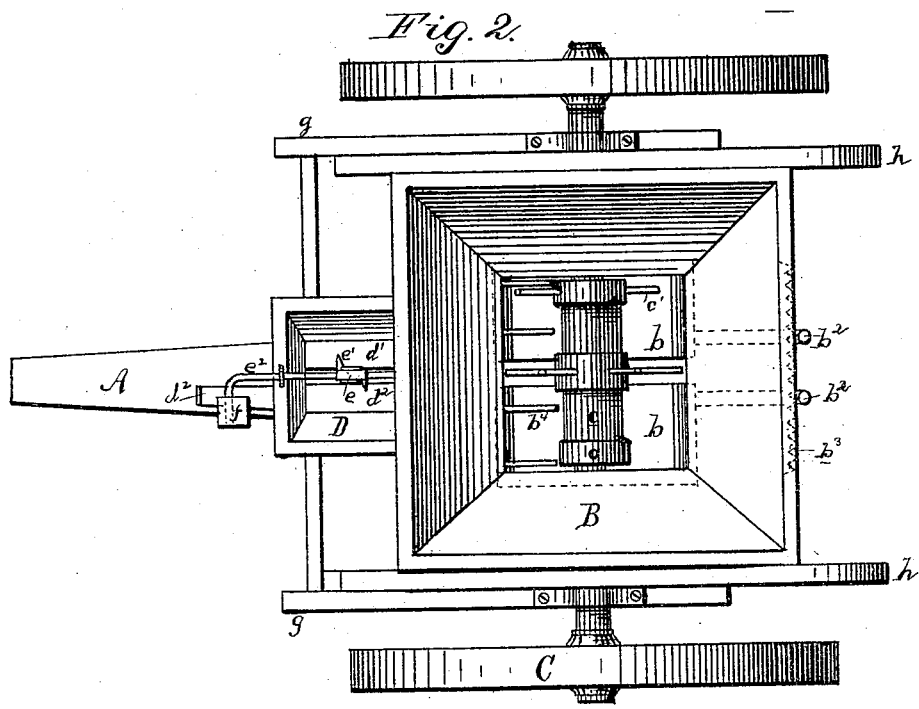
Witnesses:
J. W. Garner
W. S. D. Haines
Inventors:
John H. B. Rea,
William M. Robinson,
by Howard A. Fun,
Att'y.

UNITED STATES PATENT OFFICE.

JOHN H. B. REA AND WILLIAM M. ROBINSON, OF TRION FACTORY, GA.

FERTILIZER-DISTRIBUTER.

SPECIFICATION forming part of Letters Patent No. 249,093, dated November 1, 1881.

Application filed July 14, 1881. (No model.)

*To all whom it may concern:*

Be it known that we, JOHN H. B. REA and WILLIAM M. ROBINSON, citizens of the United States of America, residing at Trion Factory, in the county of Chattooga and State of Georgia, have invented certain new and useful Improvements in Fertilizer-Distributers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to fertilizer-distributers; and it consists of the arrangement and operation of its feeding device, as will be hereinafter fully set forth.

In the drawings, Figure 1 is a section, and Fig. 2 a plan view, of our distributer.

A is the beam. Upon its top is secured the hopper D, and to its rear the hopper B.

C are the wheels, the axle of which runs through the hopper B, and upon it the third wheel, $c$, having arms or spokes $c'$, as shown.

B is the hopper for holding the fertilizer to be distributed. The bottom is formed by the slides $b\ b$, which are pivoted at $b'$ and have their back ends attached to the levers $b^2$, ranging upon the rack $b^3$, as shown. By the levers $b^2$ the slides $b\ b$ can be brought together or separated, thus regulating, as required, the amount of fertilizer distributed. The teeth $b^4$, fastened inside the hopper B, as shown, incline downward, mesh with the teeth or spokes $c'$, and also aid to crush lumps and arrest stones or other foreign substances which may enter the hopper from the ground.

The hopper D is placed upon the beam A, and distributes fertilizer of fine quality, as guano, or the various chemical fertilizers used in agriculture. Its outlet is through the pipe $d$. Its bottom is formed by the slides $d'\ d^2$. The slide $d^2$ is pivoted at one end, while the other extends out along the beam, as shown, and acts as a lever for widening or narrowing the space through which the fertilizer passes, thus regulating the amount used. Within the hopper is the stirrer $e$. It has a vertical projection, $e^3$, which extends through the slides $d'\ d^2$ and projections $e'$, above the slides, which more effectually prevents clogging of the fertilizer. The stirrer is secured to the vibrating rod $e^2$, which has hinged to its forward end the rock-shaft $f$, pivoted to the beam A, as shown, and given motion by the toothed wheel $f'$. The wheel $f'$ engages with the ground, and by means of a crank and pin moving in the slot $f^2$ motion is given the rock-shaft, which is, in turn, imparted to the rod $e^2$ and stirrer $e$.

$f^3$ are braces for holding the wheel $f$ in position.

$g$ is a bracing-frame, extending around the front and sides of the distributer.

$h$ are the handles, secured to the sides of the hopper B.

In our fertilizer, by the use of the hoppers B and D, arranged one in front of the other, the hopper D provided with a stirrer especially adapted to prevent clogging of fine fertilizer, we are enabled to use different qualities of fertilizer at the same time.

What we claim is—

In a fertilizer-distributer, the feeding device consisting of the vertically-arranged reciprocating stirrer $e$, provided with horizontal projections $e'\ e'$, arranged upon opposite sides, and vertical projection $e^3$, extending below the bottom of the hopper, operating in combination with the actuating mechanism consisting of the horizontal rod $e^2$, operating across the top of the hopper, and the vertically-pivoted vibrating bar $f$, provided at its lower end with the slot $f^2$, in which operates the actuating-pin of the toothed wheel $f'$, substantially as described.

In testimony whereof we affix our signatures in presence of two witnesses.

JOHN H. B. REA.
WILLIAM M. ROBINSON.

Attest:
F. A. PAYNE,
S. F. TAYLOR.